United States Patent [19]

Bae et al.

[11] Patent Number: 4,819,729

[45] Date of Patent: Apr. 11, 1989

[54] METHOD FOR RECOVERING PETROLEUM USING OLIGOMERIC SURFACTANTS

[75] Inventors: J. H. Bae; S. I. Chou, both of Anaheim, Calif.

[73] Assignee: Chevron Research Company, San Francisco, Calif.

[21] Appl. No.: 66,582

[22] Filed: Jun. 24, 1987

[51] Int. Cl.$^4$ ............................................. E21B 43/22
[52] U.S. Cl. .............................. 166/305.1; 166/273; 166/275; 252/8.554
[58] Field of Search ............ 166/273, 274, 275, 305.1; 252/8.554

[56] References Cited

U.S. PATENT DOCUMENTS

| | | | |
|---|---|---|---|
| 3,527,301 | 9/1970 | Rafsnider et al. | 166/274 |
| 3,691,071 | 9/1972 | Corrin | 166/274 X |
| 4,110,229 | 8/1978 | Carlin et al. | 166/273 X |
| 4,166,038 | 8/1979 | Stournas | 166/274 X |
| 4,191,253 | 3/1980 | Kalfoglou | 166/275 |
| 4,269,270 | 5/1981 | Kalfoglou | 166/273 |
| 4,476,929 | 10/1984 | Stapp | 166/273 |
| 4,485,872 | 12/1984 | Stapp | 166/273 |
| 4,511,730 | 4/1985 | Fields | 252/8.554 X |
| 4,533,478 | 8/1985 | Fields | 166/275 X |

*Primary Examiner*—George A. Suchfield
*Attorney, Agent, or Firm*—S. R. LaPaglia; E. J. Keeling

[57] ABSTRACT

A method for recovering petroleum from a subterranean, petroleum-containing formation. It includes injecting into said formation a formulation comprising an oligomeric surfactant wherein said oligomeric surfactant has the following formula:

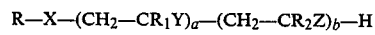

$$R-X-(CH_2-CR_1Y)_a-(CH_2-CR_2Z)_b-H$$

wherein R is a linear or branched alkyl or alkylaryl radical having from 6 to 24 carbon atoms; $R_1$ is selected from the group consisting of hydrogen, methyl, and ethyl; $R_2$ is selected from the group consisting of hydrogen, methyl, ethyl, and a hydrocarbon having the formula $CH_2COOH$; X is selected from the group consisting of sulfides, sulfones, and sulfoxides; Y is selected from the group consisting of hydrocarbons having the formulas $CN$, $CONH_2$, $CH_2CONH_2$, $CONHCH_3$, $CONHC_2H_5$, $COOCH_3$, $COOC_2H_5$, $COOC_2H_4OH$, $COOC_3H_6OH$, $CONHCH_2OH$; Z is selected from the group consisting of hydrocarbons having the formulas $COOH$, $CH_2COOH$, $OCH_3$, $OC_3H_5$, $CH_2OH$, and salts thereof; $a+b$ is from 2 to 50; and $a/(a+b)$ is from 0 to 0.8.

5 Claims, 5 Drawing Sheets

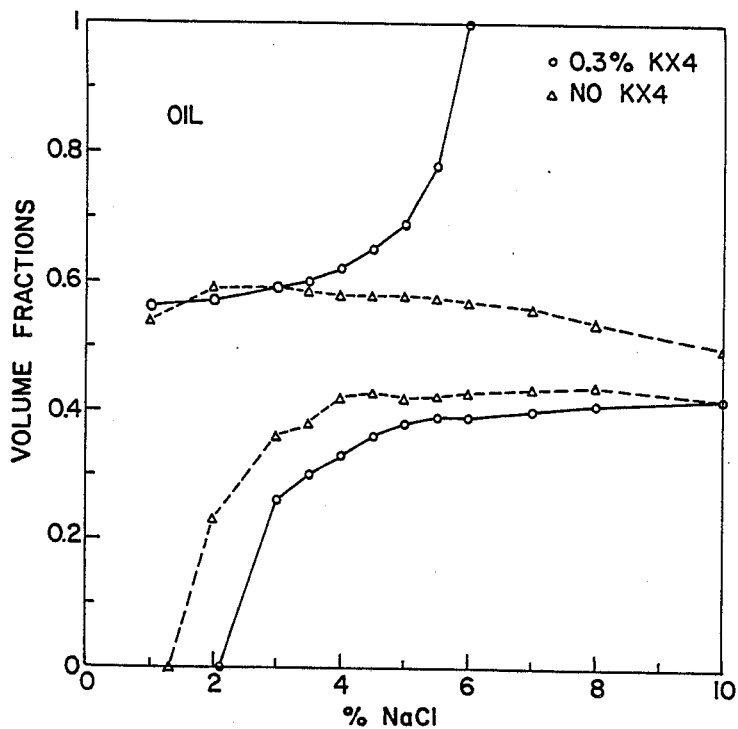
FIG._1.
PHASE VOLUME FRACTION VS. SALINITY
STEPAN SULFONATE BLEND + 1% n-PENTANOL SYSTEM
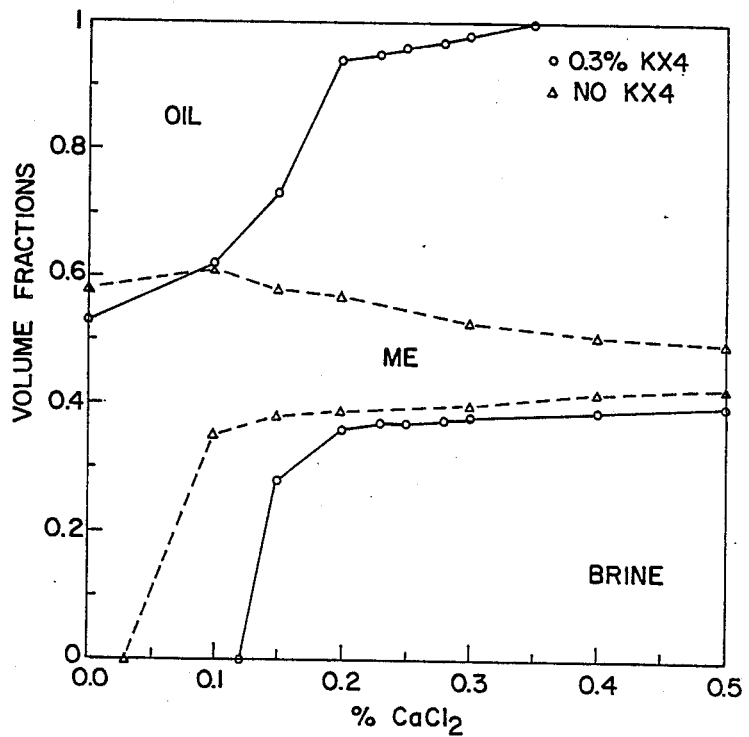
FIG._2.
PHASE VOLUME FRACTION VS. $CaCl_2$ CONCENTRATION
STEPAN SULFONATE BLEND + 1% n-PENTANOL SYSTEM

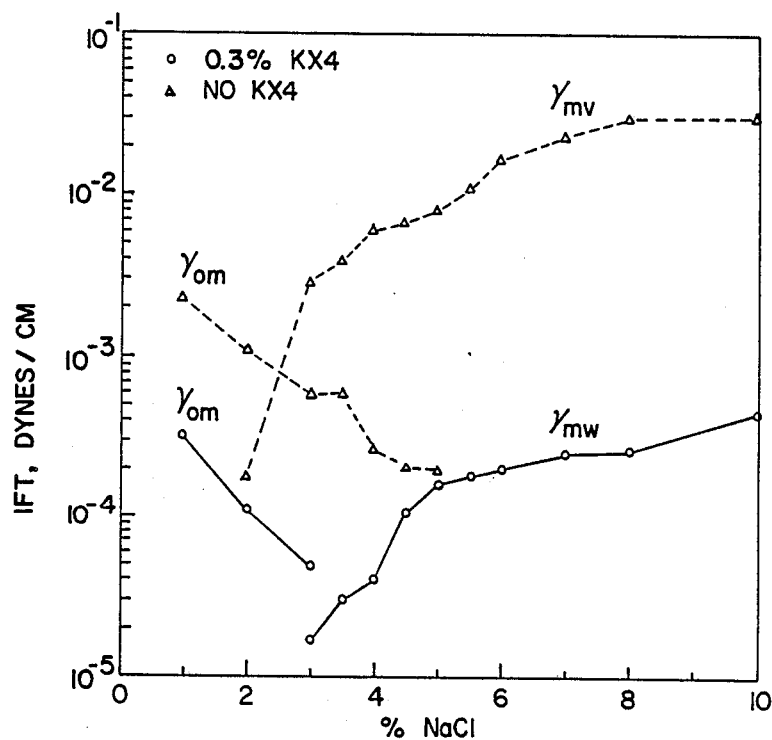
FIG._3.
INTERFACIAL TENSIONS BETWEEN MICROEMULSION AND EXCESS OIL ($\gamma_{OM}$) AND EXCESS BRINE ($\gamma_{MW}$) STEPAN SULFONATE BLEND +1% n-PENTANOL SYSTEM
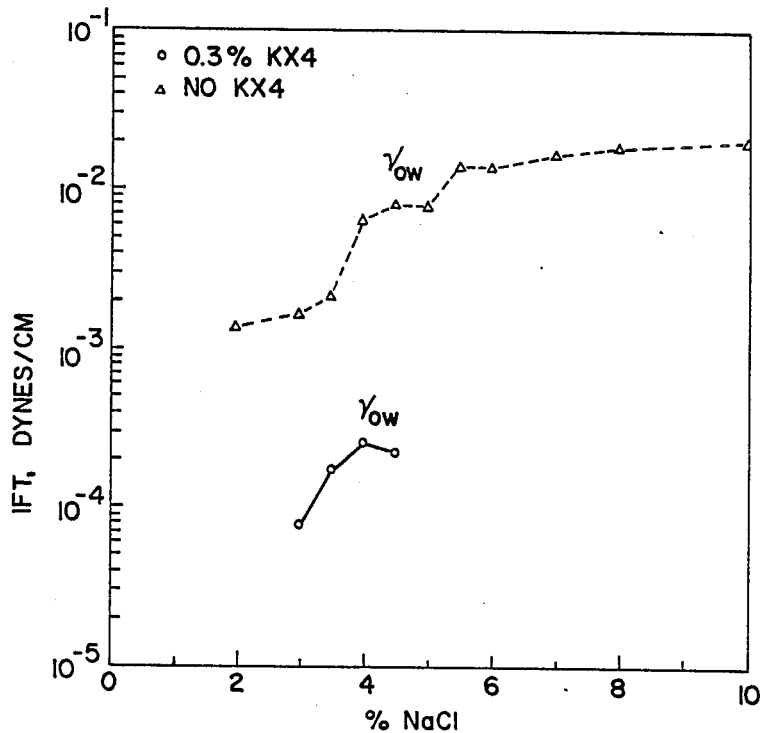
FIG._4.
INTERFACIAL TENSIONS BETWEEN EXCESS OIL AND EXCESS BRINE PHASES STEPAN SULFONATE BLEND + 1 % n- PENTANOL SYSTEM

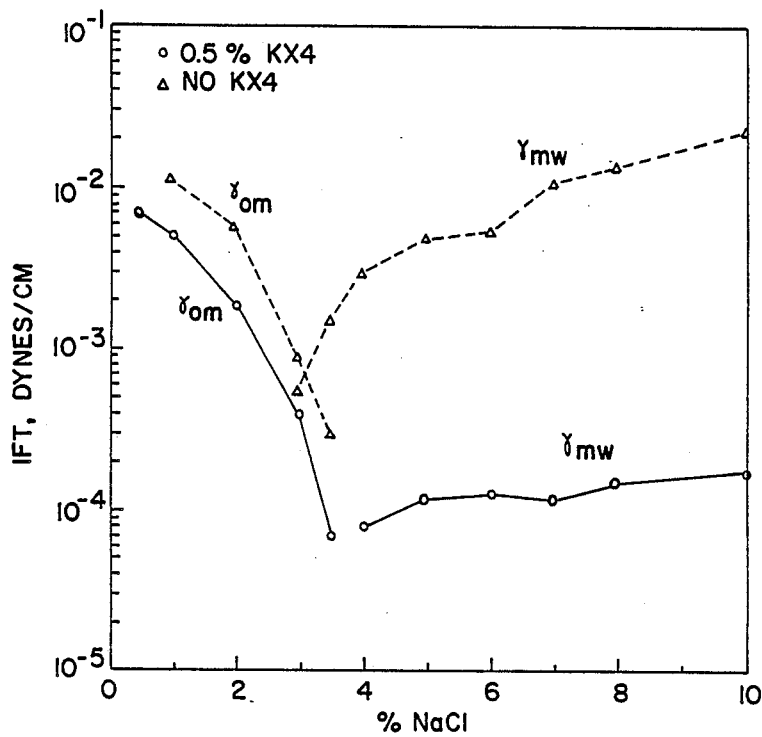
FIG._5.
INTERFACIAL TENSIONS BETWEEN MICROEMULSION AND EXCESS OIL ($\gamma_{OM}$) AND EXCESS BRINE ($\gamma_{MW}$)
CHEVRON SULFONATE BLEND + 1% SEC-BUTANOL SYSTEM
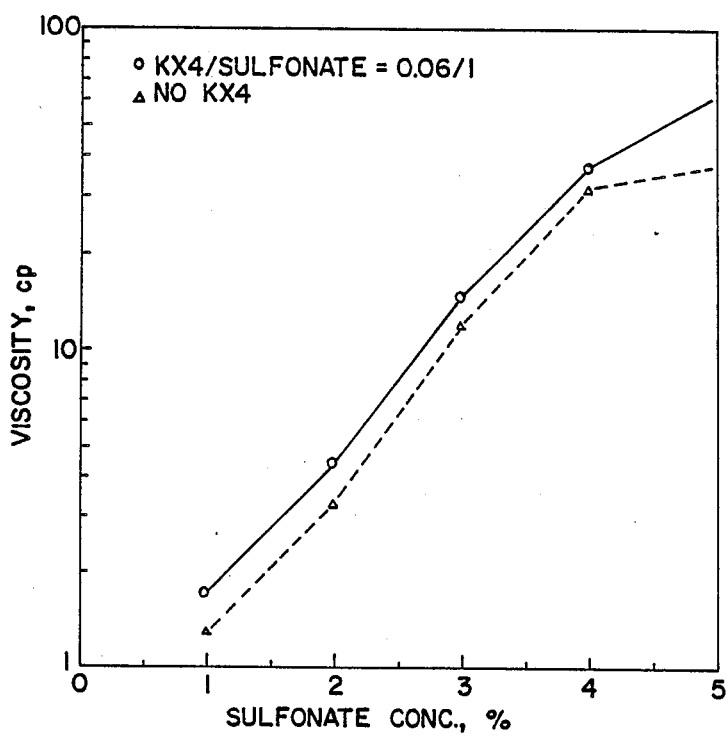
FIG._6.
VISCOSITY OF AQUEOUS SURFACTANT SOLUTION

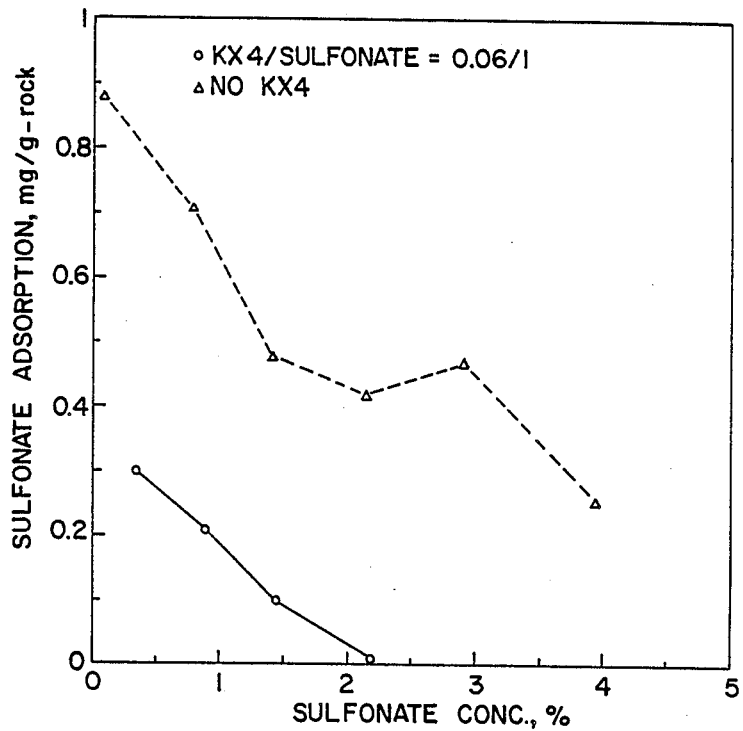
FIG._7.
ADSORPTION OF PETROLEUM SULFONATES IN BEREA SANDSTONE CORES
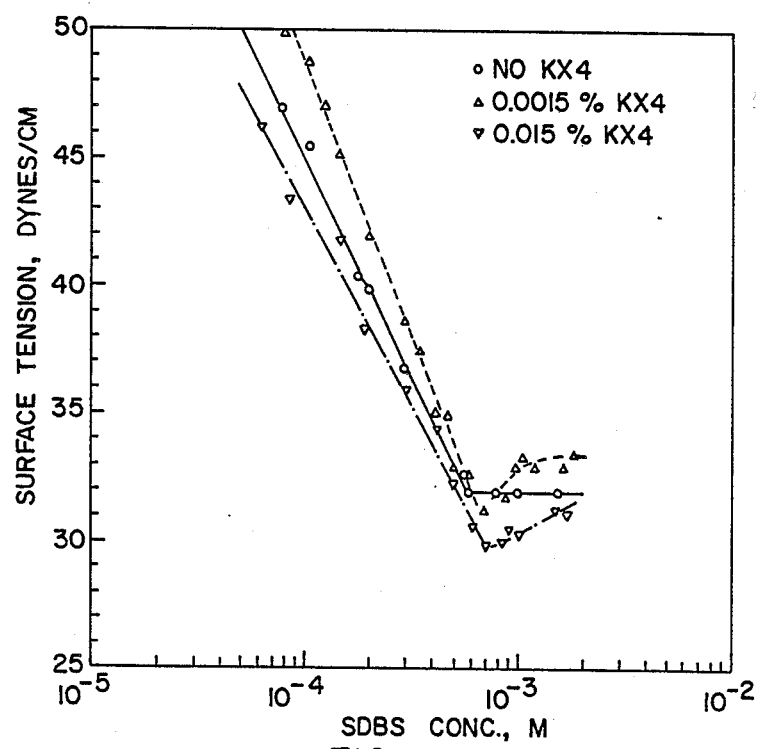
FIG._8.
SURFACE TENSION OF SODIUM DODECYLBENZENE SULFONATE IN 0.06 WT % NaCl SOLUTION

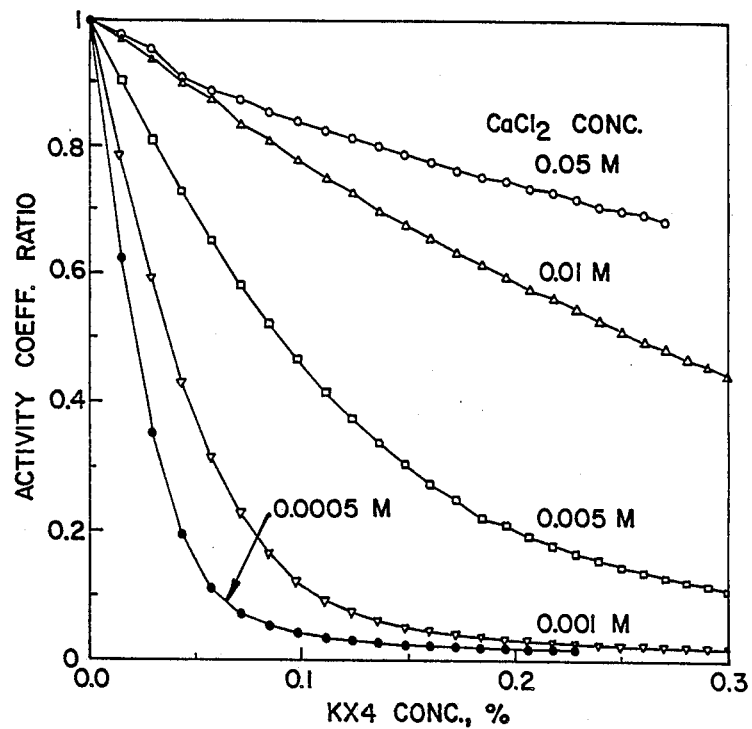
FIG.—9.
RATIO OF CALCIUMION ACTIVITY COEFFICIENT IN THE
PRESENCE OF KX4 TO THAT WITHOUT KX4

METHOD FOR RECOVERING PETROLEUM USING OLIGOMERIC SURFACTANTS

BACKGROUND OF THE INVENTION

This invention relates to a method for recovering petroleum from a subterranean, petroleum-containing formation. Specifically, it involves injecting a solution comprising an oligomeric surfactant into the formation. We have found that this method results in a higher salt and divalent ion tolerance, higher solubilization capacity, lower interfacial tension with oil and brine, lower adsorption loss, and higher viscosity.

Petroleum is found in subterranean formations or reservoirs in which it has accumulated, and recovery is accomplished initially by penetrating the reservoirs with one or more wells and pumping or permitting the petroleum to flow to the surface of the earth through these wells. Petroleum can be recovered from subterranean petroleum-containing formations only if certain conditions are present. For example, there must be an adequately high concentration of petroleum in the formation, and there must be sufficient permeability or interconnected flow channels throughout the formation to permit the flow of fluids therethrough if sufficient pressure is applied to the fluid.

When the subterranean petroleum-containing formation has natural energy present in the form of underlying active water drive, solution gas, or a high pressure gas cap above the petroleum within the formation, this natural energy is utilized intially to recover petroleum. This initial phase of petroleum recovery is referred to as primary recovery. When this natural energy source is depleted, or in the instance of those formations which do not originally contain sufficient natural energy to permit primary recovery operations, some form of supplemental recovery process must be utilized. Supplemental oil recovery is frequently referred to as secondary recovery, although in fact it may be primary, secondary, or tertiary in sequence of employment.

The most commonly utilized and economical form of supplemental recovery is water flooding, which involves the injection of water into the formation to supply the energy necessary to displace oil toward producing wells, where it is transported to the surface. Although it is generally possible to recover some additional oil by means of water flooding, from 30 to 60 percent of the oil originally in place in the formation still remains in the formation at the conclusion of a conventional water flooding operation. The failure of water flooding to recovery this remaining oil stems from a plurality of problems discussed below, which have a cumulative effect on the overall oil recovery program.

When water is forced through a capillary such as the flow channels present in subterranean petroleum-containing formations, said flow channel containing both oil and water, the efficiency with which the injected water displaces the petroleum in the formation is relatively low. This inefficient capillary displacement occurs because water and oil are immiscible and the interfacial tension between water and oil is quite high. Persons skilled in the art of oil recovery have recognized this inherent weakness of water flooding, and additives have been described in the prior art for decreasing the interfacial tension between the injected water and the formation petroleum. For example, U.S. Pat. No. 2,233,381 (1941) disclosed the use of polyglycolethers as a surface active agent to increase the capillary displacement efficiency of an aqueous flooding medium. U.S. Pat. No. 3,302,713 discloses the use of a petroleum sulfonate type of anionic surfactant, prepared from the 850° to 1,050° F. boiling range fraction of petroleum for use in an oil recovery operation. U.S. Pat. No. 3,468,377 (1969) describes the use of petroleum sulfonates of specified molecular weight for oil recovery. Other surfactants which have been proposed for surfactant oil recovery include alkyl polyalkoxylates, alkyl sulfates, alkyl sulfonates, and alkyl polyalkoxylated sulfates or sulfonates.

One major problem associated with the use of petroleum sulfonates or other alkylsulfonates and alkylaryl sulfonates is that these surfactants have little tolerance to high concentration of salts. They lose their surface activity in such environments. On the other hand, the polyalkoxylated surfactants, ionic as well as nonionic types, are known to have much higher salt tolerance but lower surface activity. Thus, it has been reported in U.S. Pat. No. 3,508,612 that a two-component surfactant mixture exemplified by a petroleum sulfonate and a polyalkoxylated surfactant exhibits improved tolerance against high salinity environments. This type of formulation has a serious drawback in that, while the salt tolerance is improved, other properties vital to the oil recovery process are sacrificed. The most often encountered problems are that the interfacial tension with oil becomes higher, the solubilization capacity of the formulation drops, the adsorption of surfactants on rock surfaces increases, and the viscosity of the formulation decreases.

Another serious concern in using a mixed formulation of petroleum sulfonates (or other surfactants operative at low salinities) and polyalkoxylated surfactants is that they tend to separate from each other when injected into the reservoir, since they have quite different characteristics in their interactions with reservoir oil, brine, and rock surfaces while they do not have sufficient mutual interaction to keep them together. Further, all commercial polyalkoxylated surfactants have an extremely broad distribution of molecular weights; they themselves tend to separate from each other in the formation. Since the formulation is optimized or designed as a whole for the reservoir, the break down of original composition in the formulation greatly reduces their oil recovery efficiency.

The present invention relates to a process and a composition used in surfactant flooding process, which alleviate above problems. In accordance with this invention, a process is provided for recovering oil from a subterranean formation wherein fluid containing an oligomeric surfactant or surfactant mixture is injected into the formation. The surfactant is characterized by the general formula:

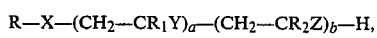

$$R-X-(CH_2-CR_1Y)_a-(CH_2-CR_2Z)_b-H,$$

where X, Y, and Z are polar or ionic functional groups; R, $R_1$ and $R_2$ are hydrocarbon chains; and a and b are average numbers of repeating units.

We found that by using a formulation comprising an oligomeric surfactant, with or without other surfactants or cosolvents, in conditions commonly found in oil fields, we can achieve enhanced oil recovery. Accordingly, it is the primary object of this invention to describe such a process.

Another more specific objective of this invention is to describe the use of oligomeric surfactant as a cosurfactant in a formulation for oil recovery processes, which results in a higher salt and divalent ion tolerance, higher solubilization capacity, lower interfacial tension with oil and brine, lower absorption loss, and higher viscosity than the original formulation. A process of using oligomeric surfactants at low concentration to improve waterflood is also described.

SUMMARY OF THE INVENTION

This invention concerns a method for recovering petroleum from a subterranean, petroleum-containing formation. It comprises injecting into the formation a formulation comprising an oligomeric surfactant which has the following formula:

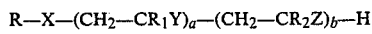

wherein
R is a linear or branched alkyl radical containing from 6 to 24 carbon atoms,
$R_1$ is hydrogen, methyl or ethyl group,
$R_2$ is hydrogen, methyl, ethyl, or $CH_2COOH$,
X is —S—, sulfonyl or sulfinyl,
Y is CN, $CONH_2$, $CH_2CONH_2$, $CONHCH_3$, $CONHC_2H_5$, $COOCH_3$, $COOC_2H_5$, $COOC_2H_4OH$, $COOC_3H_6OH$, $CONHCH_2OH$,
Z is COOH, $CH_2COOH$ or their salts,
a+b have an average value from 2 to 50, and
a/(a+b) varies from 0 to 0.8.

It should be understood that the monomer units in the above formula are randomly distributed in the oligomer; the structural formula is used for conveniences.

In a preferred form of the invention, $R_1$ and $R_2$ are hydrogen, X is sulfur, Z is COOM where M is a monovalent cation (e.g., Na, K, $NH_4$), (a+b) is in the range from 8 to 24, a/(a+b) varies from 0.05 to 0.06.

The oligomeric surfactant may be applied in a number of ways to achieve enhanced oil recovery. It may be formulated as a cosurfactant in a surfactant slug of aqueous solution, oleic solution or microemulsion. The total concentration of the surfactant mixture can very from about 2 to 20% by weight of which the oligomeric surfactant can comprise from 5 to 40% of the mixture. It may also be used as the primary surfactant, with or without other additives such as alkali and polymers, in a waterflood. In this case, the desired surfactant concentration is in the range from 0.1 to 2%.

BRIEF DESCRIPTION OF THE FIGURES

FIG. 1 is a plot of phase volume fraction vs. salinity for a Stepan Sulfonate Blend and 1% n-pentanol system.

FIG. 2 is a plot of phase volume fraction vs. $CaCl_2$ concentration for a Stepan Sulfonate Blend and 1% n-pentanol system.

FIG. 3 is a plot of interfacial tensions between microemulsion and excess oil an excess brine as a function of salinity for a Stepan Sulfonate Blend and 1% n-pentanol system.

FIG. 4 is a plot of interfacial tension between excess oil and excess brine phases as a function of salinity for a Stepan Sulfonate Blend and 1% n-pentanol system.

FIG. 5 is a plot of interfacial tensions between microemulsion and excess oil and excess brine as a function of salinity for a Chevron Blend and 1% sec-butanol system.

FIG. 6 is a plot of viscosity of aqueous surfactant solutions as a function of sulfonate concentration.

FIG. 7 is a plot of adsorption of petroleum sulfonates as a function of sulfonate concentration.

FIG. 8 is a plot of surface tension of sodium dodecylbenzene sulfonate in a 0.06 weight percent NaCl solution as a function of sodium dodecylbenzene concentration.

FIG. 9 is a plot of calcium ion activity coefficient ratio as a function of surfactant concentration.

DETAILED DESCRIPTION

Oligomeric surfactants are a unique class of surfactants which differ from conventional surfactants in their molecular structures. The hydrophilic portion of conventional surfactant molecules is usually smaller than their hydrophobic portion. For oligomeric surfactants, however, several polar or ionic functional groups, distributed along a hydrocarbon chain, form the hydrophilic part of the molecule. In addition, the hydrophilic part has a size comparable to or greater than its hydrophobic counterpart.

Most surfactants consist of a hydrocarbon chain attached with a polar group. They can be represented by a simple structural formula, R—X, where R is the hydrocarbon chain and X is an ionic ligand or several units of organic ions in the case of ionic surfactants or a string of polar functional groups such as ethylene oxide groups in the case of nonionic surfactants.

Oligomeric surfactants, on the other hand, are represented by

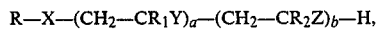

where X, Y, are polar functional groups; Z is ionic functional group; R, $R_1$, and $R_2$ are hydrocarbon chains; and a and b are numbers of repeating units.

The optimum structure of oligomeric surfactants can vary considerably, depending on the properties of the reservoir formation to which it is to be applied and on the objective of its application, i.e., as a cosurfactant or the primary surfactant. For example, when the crude oil of the reservoir is heavy, it is desirable to use a long hydrocarbon chain as R in the structural formula. On the other hand, when the reservoir salinity is high, one could use more hydrophilic functional groups as Y and Z, increase the total number of such functional groups, or increase the fraction of the ionic functional group (Z).

One important distinction between the current invention and other surfactants used for enhanced oil recovery is that two different types of monomer units comprise the hydrophilic portion of the oligomeric surfactant; one is polar while another is preferentially ionic as exemplified in the structural formula. Such a structure has several advantages. First, one can derive a broad spectrum of products by varying the type and number of the monomer units to suit specific needs. Secondly, the oligomeric surfactant thus synthesized has a narrow molecular weight distribution and is essentially pure. Thus, although the position of the monomer units are randomly distributed in the molecule, the resulting surfactant has rather uniform characteristics. This poses a significant advantage over other salt-tolerant surfactants, such as sulfated salts of polyethylene oxides (e.g., $R$—$(OC_2H_4)_x$—$SO_4Na$) which generally have a broad distribution in the number of ethylene oxide groups, in x. Since the properties of these surfactants vary drastically with x, they tend to separate from each other when injected into the reservoir. The separated components of the surfactant mixture mostly have no oil recovery capability. On the other hand, the oligomeric surfactant moves through the formation without losing its integrity.

The following examples are used to illustrate how to formulate oligomeric surfactants for enhanced oil recovery. It should be understood that their application is not limited to conditions set by these examples.

Several oligomeric surfactants are available from Uniroyal Chemical Company. Polywet KX4 (denoted as KX4) is a typical oligomeric surfactant. Commercial petroleum sulfonate surfactants, such as Petrostep 465, 420 (Stepan Chemical Company) and TRS 16, 40 (Witco Chemical Company), can be used as the primary surfactant in the surfactant formulation. An alkyl ethoxylated sulfate, Neodol 25-3S (Shell Chemical Company) was also used. These surfactants form a broad spectrum of surfactant blends to demonstrate that the oligomeric surfactant can be used under various conditions. In addition, short-chain alcohols, such as n-pentanol and sec-butanol can be added as cosolvents in the surfactant formulation.

PHASE BEHAVIOR AND SOLUBILIZATION

The phase behavior of a 5% Stepan sulfonate blend A (Petrostep 465/420, 3/1 ratio), 1% n-pentanol, with or without 0.3% KX4 in NaCl solutions equilibrated with dodecane at various salinities from 1 to 10% NaCl concentrations is shown in FIG. 1. The volume fraction of the microemulsion (ME) phase significantly increases with the addition of 0.3% KX4. Note that the solubilization of water increases at all salinities and the solubilization of oil increased when the salinity was higher than 3% NaCl. A higher solubilization capacity corresponds to a lower interfacial tension which, in turn, gives higher oil recovery efficiency.

The highest NaCl concentration to which the surfactant solution can be stable (without phase separation or precipitation) was about 1% NaCl without KX4. With 0.3% or 0.5% surfactant the stability increased to 3% or 8% NaCl, respectively. A higher stability enables one to use aqueous surfactant slugs at higher salinities.

The optimal salinity for phase behavior, defined as equal solubilization of oil and water in the microemulsion phase, increases from 3.3% to 4.5% NaCl with 0.3% oligomeric surfactant.

The effect of oligomeric surfactant on the phase behavior of different surfactant blends, alcohols, and oils is basically the same as that described above. Systems containing $CaCl_2$ were also tested. A summary of the results is given in Table 1.

In all these systems, we observed increased stability, higher optimal salinity, much higher solubilization of water, and except at low salinities a higher solubilization of oil with the addition of oligomeric surfactant. The improvement due to oligomeric surfactant is most striking in systems where the original phase behavior was poor. For example, the system No. 5 in Table 1 exhibited an abnormal phase behavior in which the volume fraction of the microemulsion phase gradually decreased as the $CaCl_2$ concentration was increased. This is shown in FIG. 2. The addition of 0.3% KX4 resulted in the normal phase behavior, with large increases in both oil and water solubilization.

The fact that oligomeric surfactant can improve the salt tolerance and oil solubilization capacity of a surfactant formulation simultaneously, we believe, is related to its unique molecular structure. The main hydrocarbon chain, R, is sufficiently long to interact favorably with the hydrocarbon chains of the petroleum sulfonates to form large mixed micelles (aggregates) of higher solubilization power, while its multiple functional groups are hydrophilic enough to keep the large mixed micelles in solution even under higher salinity environments.

INTERFACIAL TENSION

The interfacial tensions between equilibrated microemulsion phase and excess oil ($\gamma_{om}$) or excess brine ($\gamma_{mw}$) phase are shown in FIG. 3. This is the same system as that in FIG. 1. During IFT measurement, the oil droplet either tended to disperse or have an unstable (wave-like) interface with the microemulsion phase. In any event, the IFT is lower than 0.1 milli-dynes/cm. The addition of 0.3% oligomeric surfactant decreased $\gamma_{om}$ by one order of magnitude and decreased $\gamma_{mw}$ by two orders of magnitude. The IFT between excess oil and excess brine phase, $\gamma_{ow}$, exhibited a similar decrease as shown in FIG. 4. The drastic decrease of IFT's in systems containing oligomeric surfactant is consistent with the higher solubilization capacity.

For a system containing crude oil, as shown in FIG. 5, we observed a similar decrease of IFT's with the addition of oligomeric surfactant. Here, $\gamma_{mw}$ was lowered by nearly two orders of magnitude which was consistent with the large increase of solubilization of water.

VISCOSITY

Viscosity of aqueous surfactant solutions is generally higher in systems containing oligomeric surfactants. FIG. 6 shows the viscosities of a 5% Stepan sulfonate blend, 1% n-pentanol, 0 or 0.3% KX4 in 1% NaCl solution and diluted with 1% NaCl brine to give various sulfonate concentrations. The KX4/sulfonate ratio was fixed at 0.06/1.

With the addition of KX4, the viscosity increased by an average of 30%. Concurrent with this, we observed an increase in optical birefringence. These findings suggest that the addition of KX4 may cause the formation of extended microstructures in the solution. The multiple negative charges of KX4 may also contribute to the viscosity increase.

ADSORPTION BEHAVIOR

Surfactant adsorption loss to reservoir rocks is an important factor determining the economics of surfactant flooding. With only a small fraction of oligomeric surfactant in the surfactant formulation, the adsorption loss of surfactants can be drastically decreased.

The equilibrium sulfonate adsorption in Berea sandstone cores was in a range from 0.3 to 0.9 mg/g-rock in the system without oligomeric surfactant. By adding oligomeric surfactant the adsorption was reduced to below 0.3 mg/g-rock. This is shown in FIG. 7. The adsorption of oligomeric surfactant itself was in 1% NaCl brine 0.08 mg/g-rock at a concentration of 0.31%.

One reason for the very low adsorption of the oligomeric surfactant on rock surfaces is that the chain configuration of the oligomeric surfactant makes it energetically unfavorable for the surfactant to stay in the proximity of rock crevices and narrow pores. The reason that oligomeric surfactant also reduces the adsorption of petroleum sulfonates is probably caused by the formation of mixed micelles, which essentially has the effect of keeping most petroleum sulfonates in solution. This mechanism is consistent with the increased salt tolerance of petroleum sulfonates described previously.

INTERACTIONS WITH SURFACTANTS AND CATIONS

To explain the interactions between oligomeric surfactant and conventional surfactants, the surface tension of sodium dodecylbenzene sulfonate and KX4 solution was measured. As shown in FIG. 8, the critical micelle concentration (CMC) of the aqueous surfactant solution increased from $5.0 \times 10^{-4}$ to $6.6 \times 10^{-4}$ to $7.1 \times 10^{-4}$ mo/al as the KX4 concentration increased from 0 to 0.0015% to 0.015%. With KX4 present, we see a minimum in surface tension and the value is lower than that without KX4.

These features indicate the formation of mixed micelles and mixed monolayers (at air/water interface) of these two surfactants. It is possible that such interactions also occur in systems containing other surfactants and at oil/water interface leading to higher solubilization and lower IFT's.

One of the mechanisms by which oligomeric surfactant enhances the salt and divalent cation tolerance of petroleum sulfonates is by decreasing the cation activity. This happens as oligomeric surfactant molecules have multiple negative charges which, in a qualitative sense, can bind the cations and thereby decrease their activity coefficient.

The effect of the oligomeric surfactant on lowering the calcium ion activity coefficient ($f_{++}$) is shown in FIG. 9. Here, the ratio of $f_{++}$ to that without oligomeric surfactant is plotted as a function of oligomeric surfactant concentration. It is evident that the effect of oligomeric surfactant is more pronounced at a lower calcium/oligomeric surfactant ratio. For $CaCl_2$ concentration in the range from 0.001 to 0.05M, one can reduce $f_{++}$ by 30 to 98% with the addition of 0.3% oligomeric surfactant.

OIL RECOVERY BY SURFACTANT/POLYMER FLOOD

Oil displacement experiments were performed in Berea cores using surfactant formulations shown in Table 2. The cores had a length of 12 inches, a diameter of 2 inches, and a permeability of 300 to 500 mD. The cores were initially saturated with brine. They were displaced by Glenn Pool crude oil to establish the initial oil saturation and then flooded with brine to residual oil saturation. A surfactant slug of 10% or 20% pore volume (PV) size was injected, which was displaced by 1 PV of polymer solution (1,000 ppm Flocon 4800 biopolymer) and then followed by chase brine to complete the displacement process. Flow rates subsequent to the initial oil flood were 1 ft/day. Three salinities were used in the water-flood to test the effectiveness of the surfactant formulation under various conditions. The salinity of polymer solution and the chase brine was the same as that of the surfactant slug. Experiments were conducted at 35° C.

As shown in Table 2, the inclusion of 0.24% oligomeric surfactant in the formulation increased the oil recovery by 36%, when the waterflood salinity was 1.5% NaCl (case 1 and 2).

A similar degree of improvement was found at a higher waterflood salinity and hardness of 3% NaCl plus 0.5% $CaCl_2$. Comparing case 3, 5, and 7 in Table 2, we see that the tertiary oil recovery increased by 38% or 30%, respectively, when the formulation contained 0.3% or 0.5% KX4. When waterflood salinity was raised to 6% NaCl plus 1% $CaCl_2$, the addition of 0.3% or 0.5% KX4 nearly doubled the oil recovery efficiency of the original formulation. This is illustrated in case 4, 6, and 8 in Table 2.

In addition to better oil recovery, we also noted that the surfactant transport in the porous media was greatly improved in the presence of oligomeric surfactant. In floods containing KX4, about 50% to 80% of the injected surfactant was produced, whereas in the absence of KX4, more than 85% of the injected surfactant was retained in the core. This observation is in accordance with the lower surfactant adsorption and higher water solubilization capacity in the presence of KX4, as reported in previous sections.

OIL RECOVERY BY WATERFLOOD

Oligomeric surfactants can be used at low concentrations to improve the waterflood efficiency. The Berea cores used in this example had been flooded with an acidic crude oil to connate water saturation and then aged at 71° C. for 90 days. This pretreatment was intended to make the Berea cores less water-wet and hence more similar to the reservoir sands. The cores were then flooded with 1.0 PV of brine or 0.5% oligomeric surfactant solution. As shown in Table 3, the plain waterflood recovered 35% oil in place, whereas the 0.5% KX4 solution recovered 39% oil, which represents a 10% improvement. In either case, no oil was produced after about 0.5 PV injection, indicating that a substantially less amount of KX4 solution would be needed to obtain the increased oil recovery.

The improvement in waterflood efficiency was more pronounced when the rock surface was more oil-wet. This is illustrated in the following example. Dry Berea cores were saturated with crude oil and then flushed with pentane. This process left a thin coating of asphaltene on the rock surface, which made the rock surface oil-wet. The cores were dried, saturated with 1% NaCl brine, and subsequently flooded with crude oil to connate water saturation. Waterflood efficiency in these cores was then determined. As shown in Table 3, the plain waterflood only recovered 29.2% of original oil-in-place (case 3). By adding 0.5% KX4 to the waterflood, oil recovery increased to 38.1% or 46.2% (case 4 and 5 duplicate runs with different cores), which represents an average 42% improvement.

The mechanism for the improved waterflood efficiency in above examples is related to the interaction between the oligomeric surfactant and the crude oil. Such interaction causes the rock surfaces to be more water-wet, resulting in more oil recovery. Using oligomeric surfactant to improve waterflood efficiency by changing rock wettability is more effective when performed during the early stage of the waterflood. Case 6 in Table 3 illustrates an example where 0.5% KX4 solution was injected at the end of a waterflood (end of case 3). Here, little extra oil was produced.

The wettability alteration mechanism is supported by the wettability index measurement, using core plugs made preferentially oil-wet with the asphaltene precipitation method. The water Amott ratio (ratio of water spontaneously imbibed into a core at connate water saturation to the total volume of water imbibed under centrifuge) of such core plugs was about 0.27. The core plugs pretreated with 0.5% KX4 solution had an Amott ratio of about 0.5. When we added 0.5% KX4 to the 1% NaCl brine used in the imbibition measurement, the Amott ratio increased to about 0.8. The closer these ratios are to 1, the more strongly water-wet is the rock surface. Therefore, the above measurements indicated that the oligomeric surfactant made the oil-wet surface become water-wet.

TABLE 1

Salt Tolerance, Optional Salinity and Solubilization Capacity of Surfactant Formulations

| No. | Surfactant Blend | KX4 conc. | Salt | Salt Tolerance | Optimal Salinity | Solubilization at Optimal |
|---|---|---|---|---|---|---|
| 1 | 5% Stepan sulfonates | — | NaCl | 1.0% | 3.3% | 5.0 |
|  | 1% n-pentanol | 0.3% |  | 3.0% | 4.5% | 8.5 |
| 2 | 5% Stepan sulfonates | — | NaCl | 1.5% | 3.5% | 5.5 |
|  | 1% sec-butanol | 0.3% |  | 4.0% | 5.0% | 12.0 |
| 3 | 5% Witco sulfonates | — | NaCl | 0.5% | 1.0% | 10.8 |
|  | 1% n-pentanol | 0.3% |  | 1.5% | 1.1% | 21.0 |
| 4 | 5% sulfonate mixture | — | NaCl | 1.0% | 2.6% | 6.5 |
|  | 1% sec-butanol | 0.5% |  | 3.5% | 4.5% | 20.0 |
| 5 | 5% Stepan sulfonates | — | CaCl$_2$ | 0.1% | 0.1% | 6.0 |
|  | 1% n-pentanol | 0.3% |  | 0.15% | 0.15% | 12.5 |
| 6 | 4% Stepan sulfonates | — | CaCl$_2$ | 0.5% | 0.8% | 10.0 |
|  | 1% Neodol 25-3S | 0.3% |  | 1.0% | 0.8% | 11.0 |
|  | 1% n-pentanol |  |  |  |  |  |

TABLE 2

Surfactant Flood in Berea Cores

| No. | Surfactant Formulation | Surfactant Slug Size | Waterflood Salinity | Oil Saturation After - Waterflood | Oil Saturation After - Surfactant Flood | Tertiary Recovery |
|---|---|---|---|---|---|---|
| 1 | 4.24% petroleum sulfonate 0.8% n-pentanol, 1.5% NaCl | 10% PV | 1.5% NaCl | 40.2% PV | 27.6% PV | 31.3% |
| 2 | 4% petroleum sulfonate 0.24% KX4, 1.5% NaCl 0.8% n-pentanol | 10% PV | 1.5% NaCl | 40.1% PV | 23.1% PV | 42.4% |
| 3 | 5% petroleum sulfonate | 20% PV | 3% NaCl, 0.5% CaCl$_2$ | 34.5% PV | 15.9% PV | 53.9% |
| 4 | 1% cosolvent, 1% NaCl | 20% PV | 6% NaCl, 1.0% CaCl$_2$ | 31.4% PV | 18.3% PV | 41.7% |
| 5 | 4.5% petroleum sulfonate | 20% PV | 3% NaCl, 0.5% CaCl$_2$ | 31.3% PV | 8.1% PV | 74.1% |
| 6 | 1% cosolvent, 1% NaCl 0.3% KX4 | 20% PV | 6% NaCl, 1.0% CaCl$_2$ | 31.9% PV | 6.4% PV | 79.9% |
| 7 | 4.5% petroleum sulfonate | 20% PV | 3% NaCl, 0.5% CaCl$_2$ | 35.0% PV | 10.5% PV | 70.0% |
| 8 | 1% cosolvent, 1% NaCl 0.5% KX4 | 20% PV | 6% NaCl, 1.0% CaCl$_2$ | 33.4% PV | 4.1% PV | 87.7% |

TABLE 3

Waterflood in Treated Berea Cores

| Case | Surfactant Formulation | Core Treatment* | Salinity | Oil Flood | Waterflood | % Recovery |
|---|---|---|---|---|---|---|
| 1 | None | 1 | 1% NaCl | 70.2% PV | 45.4% PV | 35.3% |
| 2 | 0.5% KX4 | 1 | 1% NaCl | 70.9% PV | 43.3% PV | 39.1% |
| 3 | None | 2 | 1% NaCl | 64.3% PV | 45.5% PV | 29.2% |
| 4 | 0.5% KX4 | 2 | 1% NaCl | 63.0% PV | 39.0% PV | 38.1% |
| 5 | 0.5% KX4 | 2 | 1% NaCl | 66.2% PV | 35.6% PV | 46.2% |
| 6 | 0.5% KX4 | 2 | 1% NaCl | 45.5% PV | 44.8% PV |  |

*1: aged with crude oil, 2: asphaltene precipitation

It is not intended that this invention be limited by the specifics taught above. Rather, the invention should be interpreted in view of the prior art equivalents as applied to the scope of the invention as defined in the specification and appended claims.

What is claimed is:

1. A method for recovering petroleum from a subterranean, petroleum-containing formation comprising:
   (a) injecting into said formation a formulation comprising a surfactant wherein said surfactant has the following formula:

$$R-X-(CH_2-CR_1Y)_a-(CH_2-CR_2Z)_b-H$$

wherein R is a linear or branched alkyl or alkylaryl radical having from 6 to 24 carbon atoms; $R_1$ is selected from the group consisting of hydrogen, methyl, and ethyl; $R_2$ is selected from the group consisting of hydrogen, methyl, ethyl, and a hydrocarbon having the formula $CH_2COOH$; X is selected from the group consisting of —S—, sulfonyl, or sulfinyl; Y is selected from the group consisting of hydrocarbons having the formulas CN, $CONH_2$, $CH_2CONH_2$, $CONHCH_3$, $CONHC_2H_5$, $COOCH_3$, $COOC_2H_5$, $COOC_2H_4OH$, $COOC_3H_6OH$, and $CONHCH_2OH$; Z is selected from the group consisting of hydrocarbons having the formulas COOH, $CH_2COOH$, $OCH_3$, $OC_3H_5$, $CH_2OH$, and salts thereof; a+b is from 2 to 50; and $1/(a+b)$ is from 0 to 0.8; and
   (b) recovering said petroleum from said formation.

2. A method, according to claim 1, wherein $R_1$ is hydrogen; $R_2$ is hydrogen; X is —S—; Z has the formula COOM wherein M is a monovalent cation; and a+b is from 8 to 24.

3. A method, according to claim 2, wherein M is selected from the group consisting of Na, K and $NH_4$.

4. A method, according to claim 1, wherein a/(a+b) varies from 0.05 to 0.6.

5. A method of recovering petroleum from a subterranean, petroleum-containing formation comprising:
(a) injecting into said formation a formulation including a surfactant wherein said surfactant has the following formula:

$$R-S-(CH_2-CHY)_a-(CH_2-CHCOOM)_b-H$$

wherein R is a linear or branched alkyl or alkylaryl radical having from 6 to 24 carbon atoms; Y is selected from the group consisting of CN, $CONH_2$, $CH_2CONH_2$, $CONHCH_3$, $CONHC_2H_5$, COOCH, $COOC_2H_5$, $COOC_2H_4OH$, $COOC_3H_6OH$, and $CONHCH_2OH$; M is selected from the group consisting of Na, K and $NH_4$; a+b is from 8 to 24; and a/(a+b) is from 0.05 to 0.6; and
(b) recovering said petroleum from said formation.

* * * * *